May 2, 1933. T. FITZGERALD 1,906,847
DOUGH TWISTING OR BRAIDING MACHINE
Filed Oct. 10, 1932 2 Sheets-Sheet 1
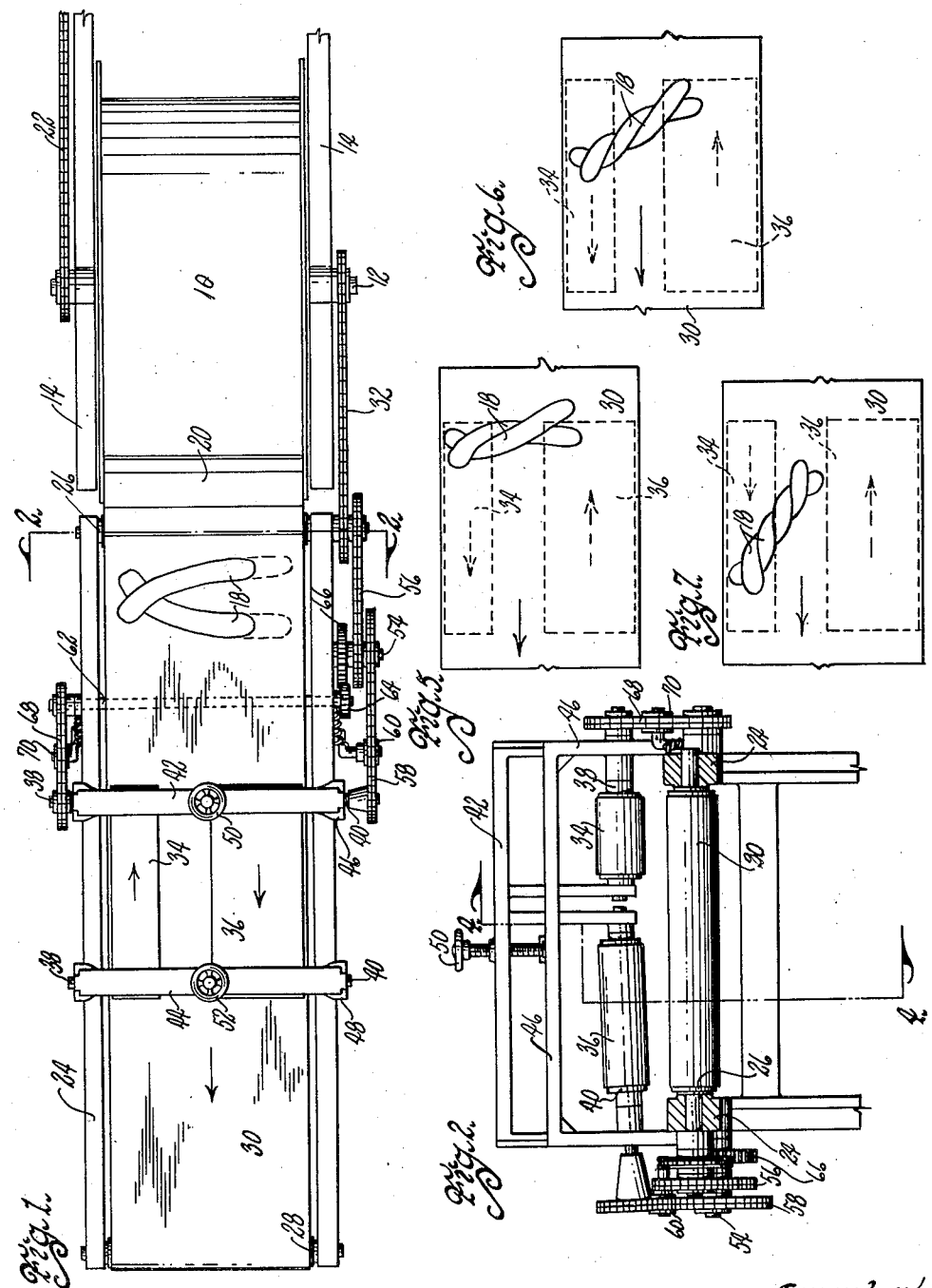

May 2, 1933.  T. FITZGERALD  1,906,847
DOUGH TWISTING OR BRAIDING MACHINE
Filed Oct. 10, 1932   2 Sheets-Sheet 2
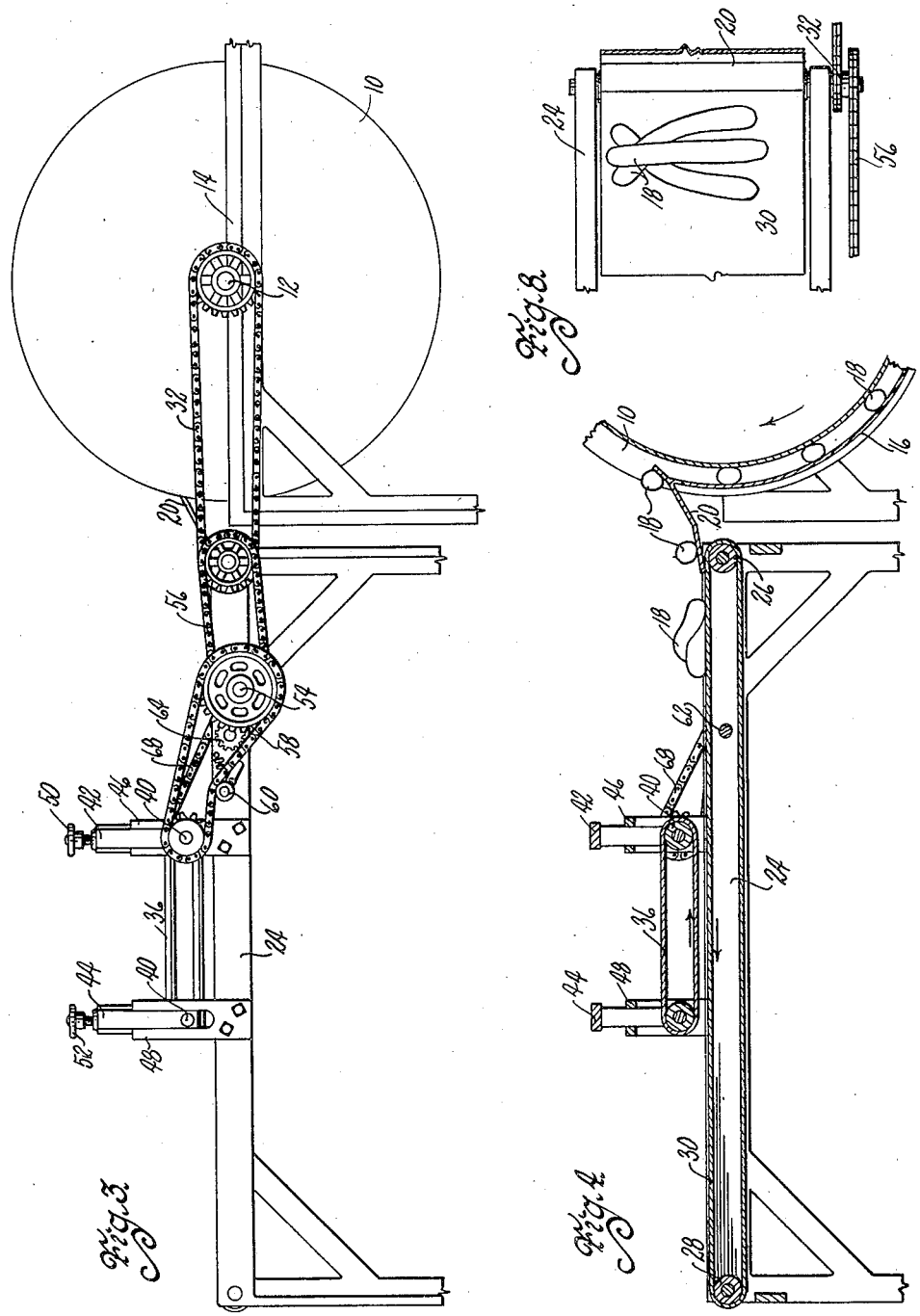
Inventor
Thomas Fitzgerald
By Bair, Freeman & Sinclair
Attorneys
Witness
Edw. Seiler Patented May 2, 1933

1,906,847

UNITED STATES PATENT OFFICE

THOMAS FITZGERALD, OF DES MOINES, IOWA

DOUGH TWISTING OR BRAIDING MACHINE

Application filed October 10, 1932. Serial No. 637,076.

The object of this invention is to provide improved mechanism for mechanically twisting or braiding two or more molded rolls of dough together and making them ready to be placed in the pan as a unit for baking a loaf of bread.

A further object of the invention is to provide a mechanism including a series of endless conveyers or belts so arranged as to engage two or more associated rolls of dough for causing an intertwisted relation of the rolls preliminary to the baking of a so-called braided or twisted loaf of bread.

Still another object of the invention is to provide convenient means for adjusting the apparatus for operation upon dough rolls of varying thickness or weight.

Another object of the invention is to provide an apparatus of the character set forth which is simple and comparatively inexpensive and yet rapid and efficient in operation.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a plan view of a machine embodying my invention in association with a molder drum, two elongated rolls of dough being shown in the associated relation which they are caused to assume preliminary to the operation of the twisting apparatus.

Figure 2 is an end elevation, partly in section, on the line 2—2 of Figure 1.

Figure 3 is a side elevation of the mechanism shown in Figure 1.

Figure 4 is a longitudinal section substantially on the line 4—4 of Figure 2.

Figure 5 is a plan view of a portion of the conveyer belt and twisting elements, showing the two rolls of dough in the position occupied after the first twisting engagement.

Figure 6 is a similar view of the parts at a later point in the operation, namely after two twists have been given to the associated rolls of dough.

Figure 7 is a similar view at a still later point, after the twisting operation has been completed.

Figure 8 is a similar view showing how three rolls of dough may be associated preliminary to the twisting operation.

In the baking of bread it is regarded as desirable to obtain as fine a texture and as close a grain as possible of the baked loaf. This is particularly desirable in connection with the commercial baking of the now popular pre-sliced loaf, because a coarse grained loaf would facilitate the passage of air and consequent undesirable drying out of the bread. In the effort to secure a close grained loaf there has been developed rather recently a product which has been known as the "braided" loaf, involving the intertwisting or braiding of two or more elongated rolls of dough which are then placed in the pan as a unit to form the baked loaf. This twisting or braiding of separate elements to produce the unitary dough loaf results in an elongation of the gluten particles of dough, which seems to be very efficacious in securing the desired closeness of grain.

In preparing the dough for the so-called braided or twisted loaf, the dough is formed by molding into elongated rolls of substantially cylindrical shape, these rolls being of less size, particularly as to diameter, than the former molded loaf which was made up of a single molded element. By combining two or more of these dough elements in the form of narrow elongated rolls, through the twisting or braiding operation, a unitary loaf of dough is produced of the desired size and weight.

Heretofore it has been customary to accomplish the braiding or twisting of the dough rolls by hand, one workman standing at each side of the table or conveyer upon which the elements are discharged from the molding apparatus, these workmen each grasping two or more of the elements or rolls at one end and rapidly twisting them together, after which they are placed in the pan by another workman who usually gives a final twist to the loaf thus formed as he places the same in the pan.

My invention relates to mechanical means for causing the intertwisted or braided relation of the rolls, thus eliminating the services of at least one workman and carrying out the operation rapidly and more uniformly than could be accomplished by hand.

My improved braiding or twisting mechanism is placed in line with and adjacent to the dough molding apparatus and in position to receive rolled parcels or molded rolls of dough therefrom. The final element of the molding apparatus may be a molder extension drum designated by the numeral 10, this drum being arranged for rotation on a horizontal shaft 12 supported in a frame 14. The drum 10 cooperates with a stationary compression plate or curved breast 16 and parcels of dough are rolled between the periphery of the drum and this compression plate, thus serving to elongate them into cylindrical units or rolls such as 18. The completed rolls 18 are discharged over an apron 20 and received upon the twisting machine. The molding drum 10 is rotated by sprocket gearing 22 or the like associated with any suitable source of power.

My machine includes a frame 24 which carries at its ends rotatably mounted rollers 26 and 28 over which a conveyer belt 30 is arranged for traveling, the upper run of said belt traveling in a direction away from the molding apparatus. The conveyer belt 30 may be driven by any suitable means such as sprocket gearing 32 connecting the conveyer roller 26 with the molding drum 10. The apron 20 overlaps the initial end of the conveyer belt 30 and the molded rolls 18 are discharged one at a time from the apron upon the upper surface of the belt and in a position transversely of the latter.

A pair of relatively short endless belts are arranged above the central portion of the conveyer belt 30 and parallel therewith and are adapted to cooperate with said conveyer belt in acting upon the dough rolls to secure the desired twisted relation. These auxiliary belts are placed side by side in a spaced apart relation and are arranged for travel in opposite directions. One of them, which may be termed the holding belt, may be rather narrow and it is designated by the numeral 34. The other or wider belt, which may be termed the twisting belt, is designated by the numeral 36.

It is desirable to provide means for readily and quickly adjusting the spacing of the belts 34 and 36 above the conveyer belt 30, in order that they may be employed for operating upon dough rolls of different weight or thickness. The belts 34 and 36 are arranged for rotation on rollers 38 and 40 respectively and these rollers are journaled in adjustable frames 42 and 44 extending transversely of the machine and adjustably engaging supporting frames 46 and 48, which extend upwardly from the side members of the main frame 24. The frames 42 and 44 are arranged for vertical adjustment with respect to the frames 46 and 48 respectively and preferably have tongue and groove connections therewith as shown. The adjustable frames and supporting frames are of yoke form so that they may extend across the main frame 24 and in spaced relation to the belt 30. The adjustment of the frames 42 and 44 is accomplished by means of screw devices 50 and 52 respectively, these screw devices having threaded connections with the central portions of the frames 42 and 44 and having swivel connections with the central portions of the supporting frames 46 and 48 respectively. By turning the screws 50 and 52 manually the positions of the adjustable frames 42 and 44 may be regulated, thereby adjusting the spacing of the belts 34 and 36 relative to the upper surface of the conveyer belt 30.

The holding belt 34 and twisting belt 36 are driven simultaneously with and by the same mechanism which drives the conveyer belt 30 and to that end a stub shaft 54 is journaled in and projects outwardly from one side of the main frame 24. The stub shaft 54 is operatively connected with the conveyer roller 26 of the conveyer belt by any suitable means such as sprocket gearing 56. The stub shaft 54 is also operatively connected with one of the rollers 40 of the braiding belt 36 by sprocket gearing 58, the arrangement being such that the belt 36 is driven in the same direction as the belt 30 and at an accelerated speed, preferably twice as fast as the belt 30. A spring pressed tightener device 60 preferably engages the chain of the sprocket gearing 58 for the purpose of keeping it in taut condition regardless of the position of vertical adjustment of the driven roller 40.

A countershaft 62 is journaled transversely of the main frame 24 and is driven by means of a pinion 64 fixed thereto and engaging a reversing gear 66 fixed to the stub shaft 54. At its opposite end the countershaft 62 is operatively connected by sprocket gearing 68 to one of the rollers 38 of the holding belt 34. By this means the holding belt is driven in a direction opposite to the travel of the conveyer belt 30 and preferably at approximately the same rate of speed. A spring pressed tightener device 70 preferably is applied to the chain of the sprocket gearing 68 to keep the latter member in taut condition regardless of the position of vertical adjustment of the holding belt.

In operation two of the dough rolls such as 18 are placed in overlapping or juxtaposed arrangement upon the initial end of the conveyer belt 30 immediately after being received thereon from the molding apparatus. This is accomplished in any suitable manner as by a workman standing at one side of the machine, and the two rolls are caused to be in juxtaposed or associated relation, as for instance to overlap as shown in Figure 1, being placed in slightly inclined or curved position so that the end of the roll nearest the molding apparatus will extend across the end of the other, the overlapping ends being those which are in substantial alignment with the holding belt 34. The travel of the conveyer belt 30 will carry the overlapped rolls toward the belts 34 and 36 and the spacing of these belts above the surface of the conveyer belt is such that the rolls 18 will be engaged by the lower surfaces of the belts 34 and 36.

It will be remembered that the belt 36 is driven in the same direction as the belt 30 and that the belt 34 is driven in the opposite direction. However, it is the lower surfaces of these belts which cooperate with the belt 30 which means that the lower surface of the belt 34 is traveling in the same direction as the upper surface of the conveyer belt 30, whereas the lower surface of the twisting belt 36 is traveling in the opposite direction. The function of the holding belt 34 is to engage and hold the overlapped ends of the two rolls 18 while they are passing beneath said belt and the function of the twisting belt 36 is to cause the opposite end of the first roll 18 to be rolled over the similar end of the other roller. This action is accomplished by the reverse travel of that part of the belt 36 which engages the roll and the first step in this process is illustrated in Figure 5. This twisting action is repeated for further engagement of the twisting belt with the loose end of the roll 18 which is then in advance, thereby causing this loose end to be thrown over the end portion of the other roll as illustrated in Figure 6.

The action of the belts likewise tends to cause the interengaging rolls to be thrown into more of a diagonal or inclined position with respect to the conveyer belt 34 upon which they are being carried. After two or more of the twisting operations of the belt 36 the trailing end of the interengaging rolls will reach the space between the two belts 34 and 36 as illustrated in Figure 7, and thereupon the twisting operation will of course cease because there is no further engagement of the dough by the belt 36.

The dough unit composed of the two rolls in twisted relation is shortly released from beneath the holding belt 34 and is carried to the terminal end portion of the conveyer belt 30 from which it is taken manually by a workman who is performing the panning operation. If deemed desirable or necessary this workman may give a final twist to the dough unit as he places it in the pan.

This mechanism functions to cause an intertwisted or braided relation of the dough rolls and to accomplish this rapidly and uniformly because for any given position of adjustment of the belts 34 and 36 there is a uniform holding action by the belt 36 and rolling or twisting action by the belt 36, it being understood that the rolls 18 discharged from the molding apparatus are uniform as to weight and dimensions. The use of this machine also eliminates the need for at least one workman who would be needed to assist in the manual twisting of the rolls according to the present methods.

If desired three dough rolls may be interengaged and twisted together through the operation of this machine. When three rolls are used they are placed manually in the position illustrated in Figure 8, the first two being placed as previously described and the third roll being laid in a position transversely of the conveyer belt and crossing the other two rolls at the point where they overlap each other. The twisting operation of the three rolls is carried out in the same manner as previously described.

The twisting mechanism is also capable of operating upon dough rolls of different lengths as illustrated by the dotted lines in Figure 1. Whatever the length of the rolls, however, the overlapping ends should be placed near that edge of the conveyer belt 30 which is overlaid by the holding belt 34, in order that these overlapping ends may be engaged and gripped by the last named members.

It will be noted from Figure 2 that the twisting belt 36 is inclined slightly toward the surface of the conveyer belt 26 at its outer edge, thus leaving a wider space between the conveyer belt and the inner edge of the member 36. This is to facilitate the engagement of the loose ends of the rolls and to prevent imposing too much pressure at the points where said rolls overlie each other as will be better understood by observing the positions of the various parts as indicated in Figures 5 and 6.

It has been demonstrated that the use of this machine in carrying out the twisting or braiding operation results in securing a baked loaf of finer texture and closer grain than when the twisting is done by hand.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. A machine of the character described comprising a conveyer belt for receiving and conveying rolls of dough, one roll being arranged with one end overlapping an end of a similar roll, a rotary holding member arranged above the belt and adapted to engage the overlapped ends of said rolls as they travel on said belt, and a rotary twisting member arranged above said belt and having a surface moving in the opposite direction to the conveying surface thereof, said twisting member adapted to engage the free ends of the rolls for throwing one over the other to produce a twisted relation.

2. A machine of the character described comprising a conveyer belt for receiving and conveying rolls of dough, one roll being arranged with one end overlapping an end of a similar roll, a rotary holding member arranged above the belt and adapted to engage the overlapped ends of said rolls as they travel on said belt, and a rotary twisting member arranged above said belt and having a surface moving in the opposite direction to the conveying surface thereof, said twisting member adapted to engage the free ends of the rolls for throwing one over the other to produce a twisted relation, said holding and twisting members being mounted for vertical adjustment to vary the degree of their spacing above the surface of the conveyer belt.

3. A machine of the character described comprising a conveyer belt for receiving and conveying rolls of dough, one roll being arranged with one end overlapping an end of a similar roll, a rotary holding member arranged above the belt and adapted to engage the overlapped ends of said rolls as they travel on said belt, a rotary twisting member arranged above said belt and having a surface moving in the opposite direction to the conveying surface thereof, said twisting member adapted to engage the free ends of the rolls for throwing one over the other to produce a twisted relation, and means for driving said twisting member at an accelerated speed relative to the travel of the conveyer belt.

4. A machine of the character described comprising a conveyer belt for receiving and conveying rolls of dough, one roll being arranged with one end overlapping an end of a similar roll, an endless holding belt arranged for travel above and parallel with said conveyer belt, an endless twisting belt parallel with and spaced laterally from the holding belt and also above the conveyer belt, said holding belt having its lower surface traveling in the same direction as the upper surface of the conveyer belt and adapted to engage the overlapped ends of the two rolls for holding the same in their relative positions, said twisting belt having its lower surface traveling in the opposite direction from the upper surface of the conveyer belt and adapted to engage the free end of one roll for throwing it over another.

5. A machine of the character described comprising a conveyer belt for receiving and conveying rolls of dough, one roll being arranged with one end overlapping an end of a similar roll, an endless holding belt arranged for travel above and parallel with said conveyer belt, an endless twisting belt parallel with and spaced laterally from the holding belt and also above the conveyer belt, said holding belt having its lower surface traveling in the same direction as the upper surface of the conveyer belt and adapted to engage the overlapped ends of the two rolls for holding the same in their relative positions, said twisting belt having its lower surface traveling in the opposite direction from and more rapidly than the upper surface of the conveyer belt and adapted to engage the free end of one roll for throwing it over another.

6. A machine of the character described comprising a conveyer belt for receiving and conveying rolls of dough, one roll being arranged with one end overlapping an end of a similar roll, an endless holding belt arranged for travel above and parallel with said conveyer belt, an endless twisting belt parallel with and spaced laterally from the holding belt and also above the conveyer belt, said holding belt having its lower surface traveling in the same direction as the upper surface of the conveyer belt and adapted to engage the overlapped ends of the two rolls for holding the same in their relative positions, said twisting belt having its lower surface traveling in the opposite direction from the upper surface of the conveyer belt and adapted to engage the free end of one roll for throwing it over another, frames in which the rollers of said holding and twisting belts are journaled, and means for vertically adjusting said frames relative to the conveyer belt for varying the spacing of the cooperating surfaces of the respective belts.

7. A machine of the character described comprising a conveyer belt for receiving and conveying rolls of dough, one roll being arranged with one end overlapping an end of a similar roll, an endless holding belt arranged for travel above and parallel with said conveyer belt, an endless twisting belt parallel with and spaced laterally from the holding belt and also above the conveyer belt, said holding belt having its lower surface traveling in the same direction as the upper surface of the conveyer belt and adapted to engage the overlapped ends of the two rolls for holding the same in their relative positions, said twisting belt having its lower surface traveling in the opposite direction from the upper surface of the conveyer belt and adapted to engage the free end of one roll for throwing it over another, the lower surface of said twisted belt being inclined toward the surface of the conveyer belt at its outer edge.

8. A dough twisting machine comprising a conveyer belt for receiving and conveying rolls of dough in juxtaposed relation, a rotary holding member arranged above the belt and adapted to engage the juxtaposed rolls at one end as they travel on said belt, and a rotary twisting member arranged above said belt and having a surface moving in the opposite direction to the conveying surface thereof, said twisting member being adapted to engage the other ends of the juxtaposed rolls for successively throwing one over the other to produce a twisted relation.

9. A dough twisting machine comprising a conveyer for receiving and conveying rolls of dough in juxtaposed relation, means arranged above the conveyer for gripping and holding the juxtaposed rolls at one end as they travel on said conveyer, and means above the surface of the conveyer and moving oppositely thereto for engaging the juxtaposed rolls at the other end as they travel on said conveyer for throwing one over the other to produce a twisted relation.

10. A dough twisting machine comprising a conveyer for receiving and conveying rolls of dough in juxtaposed relation, holding means for gripping the juxtaposed rolls at one end as they travel on said conveyer, and a rotary twisting member arranged above said belt and adapted to engage the other ends of the juxtaposed rolls as they travel on said conveyer, for successively throwing one over the other to produce a twisted relation.

THOMAS FITZGERALD.